United States Patent
Joseph et al.

(10) Patent No.: US 11,668,410 B2
(45) Date of Patent: Jun. 6, 2023

(54) VALVE POSITION SENSING USING ACOUSTICS

(71) Applicant: Halliburton Energy Services, Inc., Houston, TX (US)

(72) Inventors: Joseph Chakkungal Joseph, The Woodlands, TX (US); Ravi Sharad Vayeda, Spring, TX (US); Ziquan Wang, Houston, TX (US); Paul Gregory James, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 287 days.

(21) Appl. No.: 16/872,477

(22) Filed: May 12, 2020

(65) Prior Publication Data
US 2021/0356054 A1    Nov. 18, 2021

(51) Int. Cl.
*F16K 37/00* (2006.01)
*E21B 34/16* (2006.01)
*E21B 34/14* (2006.01)

(52) U.S. Cl.
CPC ...... *F16K 37/0083* (2013.01); *F16K 37/0041* (2013.01); *E21B 34/14* (2013.01); *E21B 34/16* (2013.01)

(58) Field of Classification Search
CPC ............. F16K 37/0083; F16K 37/0041; F16K 37/0033; F16K 3/265; F16K 3/262; E21B 34/14; E21B 34/16
See application file for complete search history.

(56) References Cited

U.S. PATENT DOCUMENTS

| 7,083,006 B2 * | 8/2006 | Kruspe ..................... G01V 3/32 175/320 |
| 10,119,390 B2 * | 11/2018 | Hornsby .................. E21B 47/00 |
| 2004/0140092 A1 * | 7/2004 | Robison .................. E21B 47/09 166/66 |
| 2004/0194958 A1 | 10/2004 | Mayeu et al. |
| 2007/0044563 A1 * | 3/2007 | Sarr ..................... G01N 29/226 73/618 |
| 2009/0085582 A1 | 4/2009 | Sinha |
| 2015/0337646 A1 | 11/2015 | Wang et al. |

(Continued)

OTHER PUBLICATIONS

International Search Report and Written Opinion for Application No. PCT/US2020/033743, dated Feb. 1, 2021.

*Primary Examiner* — Suman K Nath
(74) *Attorney, Agent, or Firm* — Scott Richardson; C. Tumey Law Group PLLC

(57) ABSTRACT

A method and system for determining a position of a linearly translating member. The method may comprise transmitting an excitation into a linearly translating member through one or more couplers from an acoustic device disposed in an outer housing, recording a reflected excitation from the linearly translating member with the acoustic device, and identifying a position of the linearly translating member with respect to the acoustic device. The system may comprise an outer housing, a linearly translating member disposed within the outer housing, an acoustic device disposed in the outer housing and configured to transmit an excitation at various frequencies and various amplitudes and record returned excitation frequencies and amplitudes and time of travel, and an information handling system in communication with the acoustic device.

20 Claims, 4 Drawing Sheets

(56) References Cited

U.S. PATENT DOCUMENTS

| | | |
|---|---|---|
| 2018/0045037 A1 | 2/2018 | Echols, III et al. |
| 2018/0347313 A1 | 12/2018 | Joseph et al. |
| 2018/0347344 A1 | 12/2018 | Gunasekaran et al. |
| 2019/0063213 A1* | 2/2019 | Donderici ............. E21B 47/135 |
| 2019/0071960 A1 | 3/2019 | James et al. |

\* cited by examiner

US 11,668,410 B2

VALVE POSITION SENSING USING ACOUSTICS

BACKGROUND

For oil and gas exploration and production, a network of wells, installations and other conduits may be established by connecting sections of metal pipe together. For example, a well installation may be completed, in part, by lowering multiple sections of metal pipe (i.e., a casing string) into a wellbore, and cementing the casing string in place. In some well installations, multiple casing strings are employed (e.g., a concentric multi-string arrangement) to allow for different operations related to well completion, production, or enhanced oil recovery (EOR) options.

During production operations, different tools may be disposed downhole on production tubing to control the flow of desirable fluids from a formation. In examples, downhole tools may have valves that actuate using sleeves. Currently, determining if the valve is open or closed, is determined through a linear variable resistor. The linear variable resistor requires manual calibration, has de-coupling problems, hysteresis in measurements, and is less reliable due to more moving parts.

BRIEF DESCRIPTION OF THE DRAWINGS

These drawings illustrate certain aspects of some examples of the present disclosure and should not be used to limit or define the disclosure.

DETAILED DESCRIPTION

Systems and methods discussed below may be directed to a system and method for determining the linear movement and position of any moving mechanism within a downhole tool. As an example, the methods described below could be used for determining the movement and position of a sliding sleeve in a sliding sleeve valve. The sliding sleeve is configured to "open" and "close" the valve, based at least in part on the position of the sliding sleeve. Identifying the position of the sliding sleeve allows for personnel to determine if the sliding sleeve valve is open or closed. Currently, determining the location of a valve position is accomplished through the use of a linear variable resistor housed in an atmospheric chamber with the slider magnetically coupled to the sliding sleeve to measure position. This system and methods are subject to a number of shortcomings. Specifically, these shortcomings are first, position vs resistance values must be calibrated manually for each installation, which is time consuming and expensive. Second, magnets utilized in the linear variable resistor are subject to de-coupling and losing all position measurements. Additionally, a magnetic coupling system, the linear variable resistor, is subject to significant hysteresis in measurement, to such a degree that accuracy suffers significantly when used for bi-directional measurement. A common solution for fixing, such as increasing coupling strength cannot be accomplished without increasing the drag and friction within the linear resistance device. Discussed below are systems and method for determining the location of a sliding sleeve, that do not have the shortcomings of a linear variable resistor.

Figure 1:
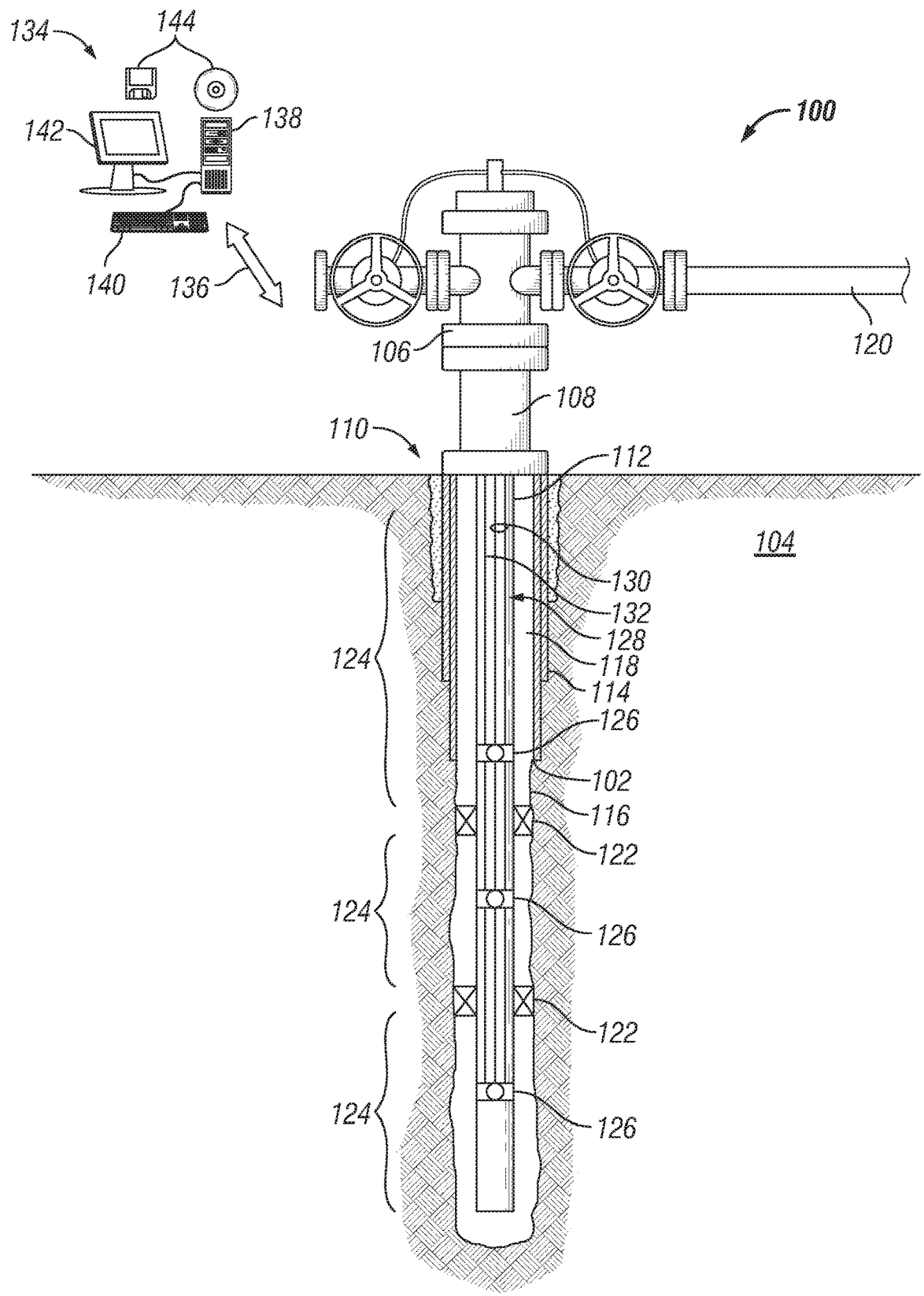
FIG. 1 illustrates an example of a production fluid recovery system.

FIG. 1 illustrates an example of a well system 100 with isolated production zones. Well system 100 may comprise a wellbore 102 formed within a formation 104. Wellbore 102 may be a vertical wellbore as illustrated or it may be a horizontal and/or a directional well. While well system 100 may be illustrated as land-based, it should be understood that the present techniques may also be applicable in offshore applications. Formation 104 may be made up of several geological layers and include one or more hydrocarbon reservoirs. As illustrated, well system 100 may include a production tree 106 and a wellhead 108 located at a well site 110. A production tubing 112 may extend from wellhead 108 into wellbore 102, which may traverse formation 104.

Without limitation, wellbore 102 may be cased with one or more casing segments 114. Casing segments 114 help maintain the structure of wellbore 102 and prevent wellbore 102 from collapsing in on itself. In some embodiments, a portion of the well may not be cased and may be referred to as "open hole." The space between production tubing 112 and casing segments 114 or wellbore wall 116 may be an annulus 118. Production fluid may enter annulus 118 from formation 104 and then may enter production tubing 112 from annulus 118 through sliding sleeve valve 126. Production tubing 112 may carry production fluid uphole to production tree 106. Production fluid may then be delivered to various surface facilities for processing via a surface pipeline 120.

Wellbore 102 may be separated into a plurality of zones with packers 122 disposed in annulus 118. Packers 122 may separate wellbore 102 into zones 124. At least a portion of production tubing 112 may be disposed within at least one zone 124 and at least one sliding sleeve valve 126 may be disposed in zone 124. During operations, when sliding sleeve valve 126 is open, fluid may flow from the respective zone 124 into production tubing 112. When a sliding sleeve valve 126 is closed, fluid from the respective zone 124 is prevented from flowing into production tubing 112. Thus, the flow of formation fluid from each zone 124 into production tubing 112 may be controlled through the actuation of a sliding sleeve valve 126. In examples, the flow of fluid may be increased or decrease incrementally by "choking" a sliding sleeve valve 126. Choking a sliding sleeve valve 126 may be defined as partially opening or partially closing a sliding sleeve valve 126. During operations, a sliding sleeve valve 126 may be at least partially open or at least partially closed by twenty five percent, fifty percent, or seventy five percent. Additionally, production tubing valves 126 may be fully opened, fully closed, or positioned between one percent and ninety nine percent open or closed.

In some examples, sliding sleeve valve 126 may be operated hydraulically and controlled by a valve control system 128. Valve control system 128 comprises a hydraulic system, discussed below, with two hydraulic lines 130 and an electrical system with an electrical line 132. Additionally, valve control system 128 may be connected to an information handling system 134 through connection 136, which may be wired and/or wireless. Systems and methods of the present disclosure may be implemented, at least in part, with information handling system 134. Information handling system 134 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 134 may be a processing unit 138, a network storage device, or any other suitable device and may vary in size, shape, performance, functionality, and price. Information handling system 134 may include random access memory (RAM), one or more processing resources such as a central processing unit (CPU) or hardware or software control logic, ROM, and/or other types of nonvolatile memory. Additional components of the information handling system 134 may include one or more disk drives, one or more network ports for communication with external devices as well as an input device 140 (e.g., keyboard, mouse, etc.) and video display 142. Information handling system 134 may also include one or more buses operable to transmit communications between the various hardware components.

Alternatively, systems and methods of the present disclosure may be implemented, at least in part, with non-transitory computer-readable media 144. Non-transitory computer-readable media 144 may include any instrumentality or aggregation of instrumentalities that may retain data and/or instructions for a period of time. Non-transitory computer-readable media 144 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

Figure 2:
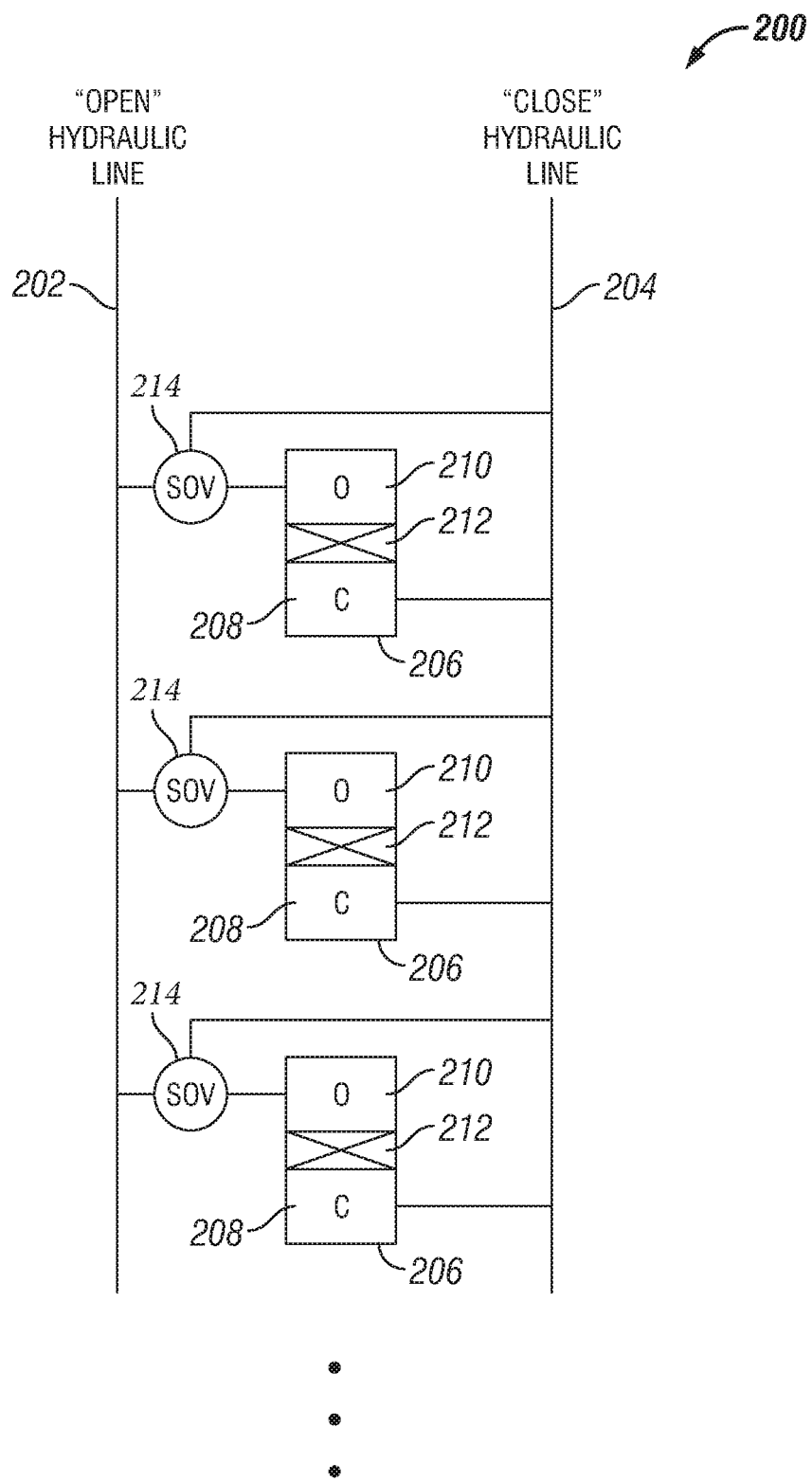
FIG. 2 illustrates a schematic of a hydraulic system.

A schematic illustrating an example of a hydraulic system 200 of valve control system 128 is illustrated in FIG. 2. In examples, hydraulic system 200 may control the position of a sliding sleeve valve 126 (e.g., referring to FIG. 1). Hydraulic system 200 may comprise an open hydraulic line 202, a close hydraulic line 204, and a piston device 206 coupled to each a sliding sleeve valve 126, as discussed further below piston device 206 is attached to a sliding sleeve of a sliding sleeve valve 126. During operation, the movement of piston device 206 may move the sliding sleeve in a sliding sleeve valve 126, which may incrementally open and/or close sliding sleeve valve 126. Thus, increasing hydraulic pressure through open hydraulic line 202 may move piston device 206, which in turn may move the sliding sleeve toward an open position. Increasing hydraulic pressure through closed hydraulic line 204 may move piston device 206, which in turn may move the sliding sleeve toward a closed position. Each piston device 206 may comprise a closed chamber 208 and an open chamber 210, separated by a piston 212. Closed chamber 208 may be hydraulically coupled to closed hydraulic line 204. Open chamber 210 may be hydraulically coupled to an electrically powered device such as a solenoid operated valve ("SOV") 214 that may be coupled to both the open hydraulic line 202 and the closed hydraulic line 204. Without limitation, SOVs 214 may be replaced by motors or other devices configured to couple and/or decouple hydraulic lines similarly to the SOVs upon receiving an electric current. In addition, SOVs 214 may be replaced by motors or actuators that directly move the valve and eliminate the need for the hydraulic control lines.

Piston 212 may be configured to move when there may be a pressure differential between closed chamber 208 and open chamber 210, thereby opening and/or closing the respective a sliding sleeve valve 126 (e.g., referring to FIG. 1). Thus, in order to close sliding sleeve valve 126, the closed chamber 208 may be pressurized via closed hydraulic line 204, bleeding open chamber 210 through open hydraulic line 202. Piston 212 and the corresponding sliding sleeve valve 126 may be thereby moved into a closed position. Inversely, in order to open sliding sleeve valve 126, open chamber 210 may be pressurized via the open hydraulic line 202 and closed chamber 208 may be bled through the closed hydraulic line 204. In both cases, a pressure differential between the open hydraulic line 202 and the close hydraulic line 204 may be applied.

However, multiple piston devices 206 may be controlled on the same open hydraulic line 202 and close hydraulic line 204. During operations, to operate each a sliding sleeve valve 126 (e.g., referring to FIG. 1) independently and one at a time, one of closed chambers 208 or open chamber 210 of each piston device 206 may be coupled to an SOV 214.

When there is no electrical current flowing through an SOV 214 (e.g., SOV 214 may not be actuated), open chamber 210 may be hydraulically coupled to closed hydraulic line 204 and separated from open hydraulic line 202, and thus not affected by hydraulic pressure in open hydraulic line 202. When a current may flow through SOV 214 (i.e., SOV 214 may be actuated), open chamber 210 may be connected to the open hydraulic line 202 and separated from the close hydraulic line 204. Thus, sliding sleeve valve 126 (e.g., referring to FIG. 1) may be controlled independently by actuating the corresponding SOV 214 and keeping the other SOVs 214 unactuated. SOVs 214 may be controlled via the electrical system of valve control system 200.

Figure 3:
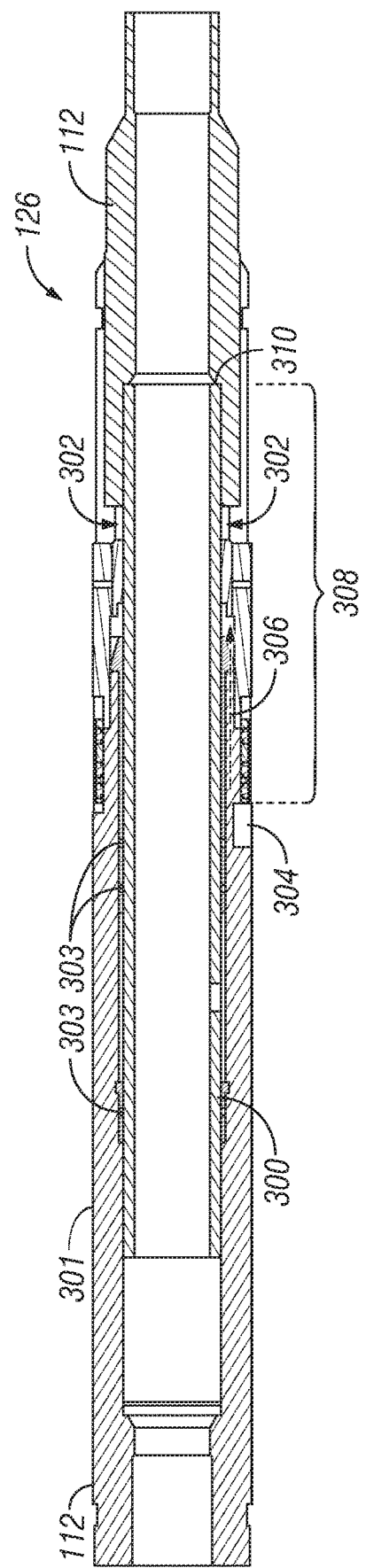
FIG. 3 illustrates an example of a sliding sleeve valve.

FIG. 3 illustrates an example of a sliding sleeve valve 126. As illustrated, a sliding sleeve 300 is disposed within an outer housing 301. For the purposes of this disclosure, sliding sleeve 300 may be referred to as a linearly translating member and further includes any linearly translating member. A linearly translating member is defined as any object that moves following a substantially linear path. Outer housing 301 is further connected to production tubing 112 at both the top and bottom of outer housing 301. Outer housing 301 may be connected to production tubing 112 by any suitable means, for example, threaded connection, press connection, and/or the like. In examples, sliding sleeve 300 is supported by one or more coupler 303, which may be a seal configured to prevent movement of fluid between outer housing 301 and sliding sleeve 300. During operations, sliding sleeve 300 may be moved axially along sliding sleeve valve 126. Movement of sliding sleeve 300 may be performed by valve control system 128 (e.g., referring to FIG. 2) and methods discussed above. Piston device 206 is shown as part of sliding sleeve 300 and outer housing 301, as defined by coupler 303. FIG. 3 illustrates sliding sleeve valve 126 in a closed position, which is defined as when sliding sleeve 300 is disposed over and obstructing fluid entrances 302. During operations to sliding sleeve valve 126 may be opened by sliding sleeve 300 axially, to expose fluid entrances 302 to the interior of sliding sleeve valve 126, this may allow fluid to enter into or exit from the sliding sleeve valve 126 and production tubing 112. Likewise sliding sleeve 300 may move in the opposite direction axially to cover fluid entrances 302, preventing the movement of fluid into or out of the sliding sleeve valve 126, thus "closing" sliding sleeve valve 126.

In examples, sliding sleeve 300 may be moved to at least partially expose, or cover, fluid entrances 302. Knowing or determining the location of sliding sleeve 300 may allow for personnel to know how and how much sliding sleeve 300 should move to obtain a desired fluid flow through fluid entrance 302 and through sliding sleeve valve 126. To determine the position of sliding sleeve 300, information handling system 134 (e.g., referring to FIG. 1) may be connected to an acoustic device 304 disposed in sliding sleeve valve 126. In examples, information handling system 134 may be connected to acoustic device 304 through wired or wireless communications.

Acoustic device 304 is an excitation source that emits and detects vibration. In examples, there may be one or more acoustic devices 304 disposed in sliding sleeve valve 126. In such examples, one acoustic device 304 may emit an excitation and another acoustic device 304 may detect the excitation after and/or before reflection. With continued reference to FIG. 3, acoustic device 304 may be disposed adjacent to at least one coupler 303 between the outer housing 301 and the sliding sleeve 300. The excitation from acoustic device 304 may be an acoustic signal, an ultrasonic signal, or an infrasonic signal. As discussed above, current position sensing technology relies on a mechanically sliding linear resistor. The systems and methods disclosed herein do not rely on any mechanically sliding components, allowing all measurement to be made directly. During measurement operations, acoustic device 304 may emit an excitation 306 along resonating area 308. Resonating area 308 is defined as the area in which excitation 306 may travel from acoustic device 304 to bottom end 310 of sliding sleeve 300.

Figure 4:
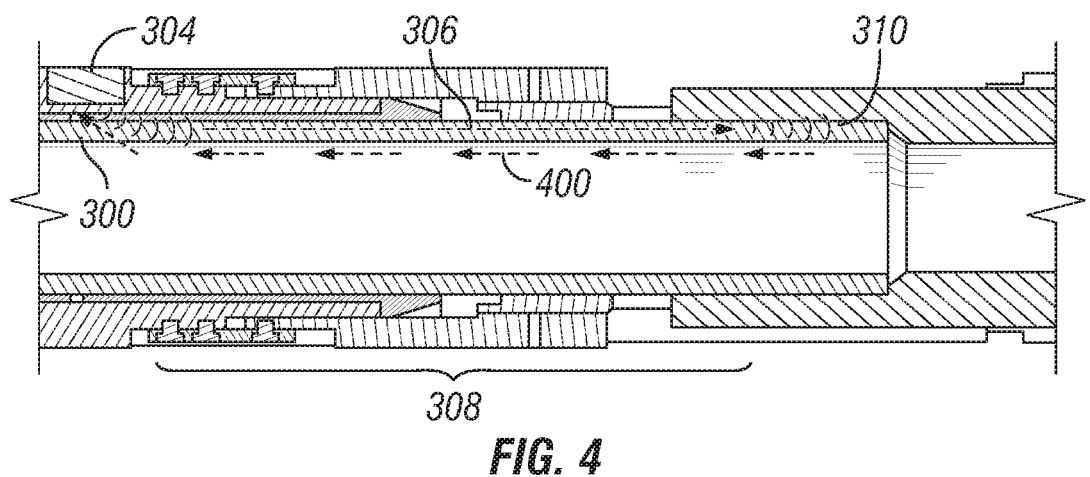
FIG. 4 illustrates an example of a measurement operation in the sliding sleeve valve.

As illustrated in FIG. 4, acoustic device 304 may be acoustically coupled to sliding sleeve 300 through at least one coupler 303. Coupler 303 acts as a "bridge," which may allow for excitation 306 to traverse from acoustic device 304 to sliding sleeve 300. Thus, during measurement operations an excitation 306 is emitted from acoustic device 304 and transfers from acoustic device 304 to sliding sleeve 300. Excitation 306 traverses the length of sliding sleeve 300 and is reflected off bottom end 310 as reflected excitation 400. Reflected excitation 400 traverses in the opposite direction of excitation 306 along sliding sleeve 300 and is detected by acoustic device 304. The time between excitation 306 and detection by acoustic device 304 is used to determine the position of sliding sleeve 300 within outer housing 301 as one or more measurements. The measured values are communicated to information handling system 134 through connection 136. In examples, acoustic device 304 may transmit measurements acoustically along production tubing 112.

During operations, sliding sleeve 300 may move within outer housing 301 from an extended position to a retracted position, or vice versa. An extended position is defined as a movement that may close or at least partially close one or more fluid entrances 302. A retracted position is defined as a movement that may open or at least partially open one or more fluid entrances 302. The movement of sliding sleeve 300 effects the time required to detect reflected excitation 400. For example, if movement of sliding sleeve 300 cause the length of resonating area 308 to be shorter, thus excitation 306 and reflected excitation 400 may have a shorter path to travel, which may allow for reflected excitation 400 to be detected in a shorter amount of time. As resonating area 308 is increased due to movement of sliding sleeve 300, excitation 306 may travel longer distances as well as reflected excitation 400. This may increase the time it may detect for the detection of reflected excitation 400.

With continued reference to FIG. 4, the transmission of excitation of 306 and movement of reflected excitation 400 through sliding sleeve 300 traverses resonating area 308. In examples, resonating area 308 may increase or decrease, based at least in part on the position of sliding sleeve 300. For example, as the length of resonating area 308 increases, excitation 306 and reflected excitation 400 traverse over a larger distance allowing for attenuation of excitation 306 and reflected excitation 400. Thus, excitation 306 may be transmitted from acoustic device 304 at first amplitude and as excitation 306 traverses resonating area 308, the first amplitude will decrease. At a reflection off bottom end 310, the remaining amplitude will continue to decrease as reflected excitation 400 travels back to acoustic device 304.

During measurement operations, the final amplitude is recorded as reflected excitation 400. The final amplitude is compared to the first amplitude. The difference between the final amplitude and the first amplitude is used to determine the length of resonating area 308. The length of resonating area 308 is used to identify where bottom end 310 of sliding sleeve 300 is disposed in sliding sleeve valve 126. Determination of the location of the bottom end 310 allows for the determination on the position of sliding sleeve 300 and if sliding sleeve valve 126 is fully opened, fully closed, or in some intermediate position, i.e. "choked."

During operations, sliding sleeve 300 may be moved, as discussed above. The movement of sliding sleeve 300 effects the amount of attenuation of the first amplitude. For example, if movement of sliding sleeve 300 cause the length of resonating area 308 to be shorter, attenuation will be less and reflected excitation 400 will be detected with a large amplitude. As resonating area 308 is increased due to movement of sliding sleeve 300, attenuation increases, and the reflected excitation 400 is detected with a smaller amplitude.

With continued reference to FIG. 4, the transmission of excitation 306 may induce sympathetic vibration, resonance, in sliding sleeve 300. Excitation 306 in this instance is normally characterized as a pulse and is not necessarily a signal at any given frequency. In examples, resonating area 308 may increase or decrease, based at least in part on the position of sliding sleeve 300. For example, as the length of resonating area 308 increases, the sympathetic response to excitation 306 will decrease in frequency. Alternately, as the length of resonating area 308 decreases, the sympathetic response to excitation 306 will increase in frequency. The frequency response to the excitation 306 provided by acoustic device 304 may be detected and correlated to a given length of resonating area 308. The length of resonating area 308 is used to identify where bottom end 310 of sliding sleeve 300 is disposed in sliding sleeve valve 126. Determination of the location of bottom end 310 allows for the determination on the position of sliding sleeve 300 and if sliding sleeve valve 126 is fully opened, fully closed, or in some intermediate position, i.e. "choked".

Data transmission may be accomplished through direct connection of the acoustic device 304 to an electric wire that may connect to information handling system 134. Data transmission may also be transmitted through acoustic signals through the production tubing 112 and may include relays to record and repeat the transmission up production tubing 112 to the information handling system 134. Additionally, measurements may be transmitted wirelessly by radio frequency from acoustic device 304 to a relay, and ultimately to information handling system 134. In examples, one or more relays may also translate the signal from the form produced by the acoustic device 304 to a form suitable for electrical communication.

Figure 5:
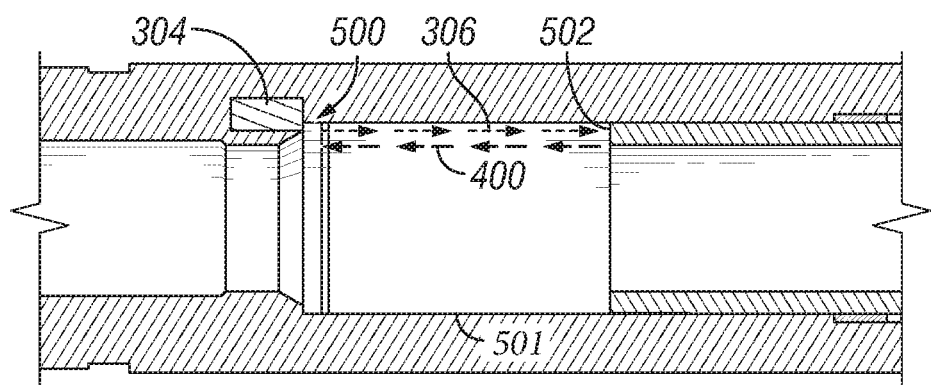
FIG. 5 illustrates another example of a measurement operation in the sliding sleeve valve.

FIG. 5 illustrates an example in which acoustic device 304 emits an excitation 306, which may be an ultrasonic wave. In this example, acoustic device 304 may be disposed at a shoulder 500 of sliding chamber 501 and acoustic device may allow for transmission of excitation 306. During measurement operations, acoustic device 304 emits an excitation 306 at a first amplitude. In this example, excitation 306 traverses through fluid disposed in sliding sleeve valve 126. Excitation 306 may then strike and reflect from the top end 502 as a reflected excitation 400. As discussed above, the first amplitude will attenuate as excitation 306 travels through the fluid disposed in sliding sleeve valve 126. As a reflection off top end 502, the remaining excitation will continue to decrease as reflected excitation 400 back to acoustic device 304.

During measurement operations, the final amplitude and the time for the excitation to traverse the distance are recorded. The final amplitude is compared to the first amplitude, and the time elapsed is compared to the speed of sound in the fluid within sliding sleeve valve 126. The difference between the final amplitude and the first amplitude is used to determine the length between acoustic device 304 and top end 502. The time from emission of excitation 306 until the detection of the returned excitation 400 may also be used to determine the length between acoustic device 304 and top end 502. This length is used to identify where top end 502 of sliding sleeve 300 is disposed in sliding sleeve valve 126. Determination of the location of top end 502 allows for the determination of whether sliding sleeve valve 126 is fully opened, fully closed, in an intermediate, "choked", position.

The methods and systems described above increase accuracy and reliability of reading the position of sliding sleeve 300 in sliding sleeve valve 126 (e.g., referring to FIG. 3). The methods and systems are not subject to the same uncertainties and mechanical failure modes inherent in current measurement systems. Additionally, when wireless intelligent completions become commonplace, these methods have communication applications as well, meaning that they could also be used to relay the position data in addition to reading it. These sensing systems would also allow detection of erosion or shortening of the sliding sleeve 300 leading to better life predictions for the well and equipment. Additionally, the system cannot de-couple, a downfall of current technology discussed above, as it is measuring a physical property. Furthermore, measuring the resonant frequency does not rely on any other moving parts, removing issues related to hysteresis and drag, which are also issues found in current technology, and discussed above. The systems and methods may include any of the various features of the systems and methods disclosed herein, including one or more of the following statements.

Statement 1: A method may comprise transmitting an excitation into a linearly translating member through one or more couplers from an acoustic device disposed in an outer housing, recording a reflected excitation from the linearly translating member with the acoustic device, and identifying a position of the linearly translating member with respect to the acoustic device.

Statement 2: The method of statement 1, wherein the reflected excitation is a frequency response.

Statement 3: The method of statements 1 or 2, wherein a fluid is disposed between the linearly translating member and a shoulder.

Statement 4: The method of statements 1-3, wherein the excitation is transmitted at a first amplitude, the reflected excitation is recorded at a second amplitude, further comprising subtracting the second amplitude from first amplitude to determine a final amplitude, wherein the final amplitude identifies the position of the linearly translating member.

Statement 5: The method of statements 1-4, wherein the excitation is transmitted at a first time, wherein the reflected excitation is detected at a second time, further comprising determining a difference between the second time from the first time to determine a final time, and wherein the final time identifies the position of the linearly translating member.

Statement 6: The method of statements 1-5, wherein the linearly translating member is a sliding sleeve and the sliding sleeve is disposed in a wellbore.

Statement 7: The method of statements 1-6, wherein the excitation is a plurality of discrete frequencies.

Statement 8: The method of statements 1-7, further comprising transmitting the position of the linearly translating member to an information handling system from the acoustic device using vibrations transmitted through one or more pipes attached to the outer housing.

Statement 9: The method of statements 1-8, further comprising transmitting the position of the linearly translating member to an information handling system using one or more relays to transmit the position along one or more pipes, wherein the one or more relays detect one or more signals from the acoustic device and retransmit the one or more signals through the one or more pipes attached to the outer housing.

Statement 10: The method of statements 1-9, further comprising transmitting the position of the linearly translating member to an information handling system through an electrical wire.

Statement 11: The method of statements 1-10, further comprising transmitting the position of the linearly translating member to an information handling system through one or more vibrations through one or more pipes connected to the outer housing through a relay that converts the one or more vibrations to a form suitable for electrical transmission through an electrical wire.

Statement 12: The method of statements 1-11, further comprising transmitting the position of the linearly translating member to an information handling system using radio frequency transmissions to a relay that converts one or more signals to a form suitable for electrical transmission through a wire.

Statement 13: A system may comprise an outer housing, a linearly translating member disposed within the outer housing, an acoustic device disposed in the outer housing and configured to transmit an excitation at various frequencies and various amplitudes and record returned excitation frequencies and amplitudes and time of travel, and an information handling system in communication with the acoustic device.

Statement 14. The system of statement 13, wherein the outer housing further includes one or more fluid entrances.

Statement 15. The system of statements 13 or 14, wherein the linearly translating member is configured to be moved within the outer housing to expose or cover one or more fluid entrances.

Statement 16. The system of statements 13-15, wherein the acoustic device is an ultrasonic device.

Statement 17. The system of statements 13-16, wherein the acoustic device is configured to transmit the excitation into a fluid.

Statement 18. The system of statements 13-17, wherein the acoustic device is configured to transmit the excitation into the linearly translating member through one or more couplers.

Statement 19. The system of statements 13-18, wherein the information handling system is further configured to transmit a position of the linearly translating member using radio frequency transmissions to a relay that converts one or more signals to a form suitable for electrical transmission through a wire.

Statement 20. The system of statements 13-19, wherein the linearly translating member is a sliding sleeve and the sliding sleeve is disposed in a wellbore.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method comprising:
    transmitting an excitation into a linearly translating member through one or more couplers from an acoustic device disposed in an outer housing, wherein the excitation traverses a resonating area to form a reflected excitation, and wherein the resonating area increases or decreases based in part on the position of the linearly translating member;
    recording the reflected excitation from the linearly translating member with the acoustic device; and
    identifying a position of the linearly translating member with respect to the acoustic device.

2. The method of claim 1, wherein the reflected excitation is a frequency response.

3. The method of claim 1, wherein a fluid is disposed between the linearly translating member and a shoulder.

4. The method of claim 1, wherein the excitation is transmitted at a first amplitude, the reflected excitation is recorded at a second amplitude, further comprising subtracting the second amplitude from first amplitude to determine a final amplitude, wherein the final amplitude identifies the position of the linearly translating member.

5. The method of claim 1, wherein the excitation is transmitted at a first time, wherein the reflected excitation is detected at a second time, further comprising determining a difference between the second time from the first time to determine a final time, and wherein the final time identifies the position of the linearly translating member.

6. The method of claim 1, wherein the linearly translating member is a sliding sleeve and the sliding sleeve is disposed in a wellbore.

7. The method of claim 1, wherein the excitation is a plurality of discrete frequencies.

8. The method of claim 1, further comprising transmitting the position of the linearly translating member to an information handling system from the acoustic device using vibrations transmitted through one or more pipes attached to the outer housing.

9. The method of claim 1, further comprising transmitting the position of the linearly translating member to an information handling system using one or more relays to transmit the position along one or more pipes, wherein the one or more relays detect one or more signals from the acoustic device and retransmit the one or more signals through the one or more pipes attached to the outer housing.

10. The method of claim 1, further comprising transmitting the position of the linearly translating member to an information handling system through an electrical wire.

11. The method of claim 1, further comprising transmitting the position of the linearly translating member to an information handling system through one or more vibrations through one or more pipes connected to the outer housing through a relay that converts the one or more vibrations to a form suitable for electrical transmission through an electrical wire.

12. The method of claim 1, further comprising transmitting the position of the linearly translating member to an information handling system using radio frequency transmissions to a relay that converts one or more signals to a form suitable for electrical transmission through a wire.

13. A system comprising:
    an outer housing;
    a linearly translating member disposed within the outer housing;
    an acoustic device disposed in the outer housing and configured to transmit an excitation at various frequencies and various amplitudes and record reflected excitation frequencies and amplitudes and time of travel;
    a resonating area, wherein the excitation traverses the resonating area to form the reflected excitation, and wherein the resonating area increases or decreases based in part on a position of the linearly translating member; and an information handling system in communication with the acoustic device.

14. The system of claim 13, wherein the outer housing further includes one or more fluid entrances.

15. The system of claim 13, wherein the linearly translating member is configured to be moved within the outer housing to expose or cover one or more fluid entrances.

16. The system of claim 13, wherein the acoustic device is an ultrasonic device.

17. The system of claim 13, wherein the acoustic device is configured to transmit the excitation into a fluid.

18. The system of claim 13, wherein the acoustic device is configured to transmit the excitation into the linearly translating member through one or more couplers.

19. The system of claim 13, wherein the information handling system is further configured to transmit a position of the linearly translating member using radio frequency transmissions to a relay that converts one or more signals to a form suitable for electrical transmission through a wire.

20. The system of claim 13, wherein the linearly translating member is a sliding sleeve and the sliding sleeve is disposed in a wellbore.

* * * * *